Aug. 25, 1959   A. WEISENBURGER   2,900,722
SHEARS
Filed June 9, 1958
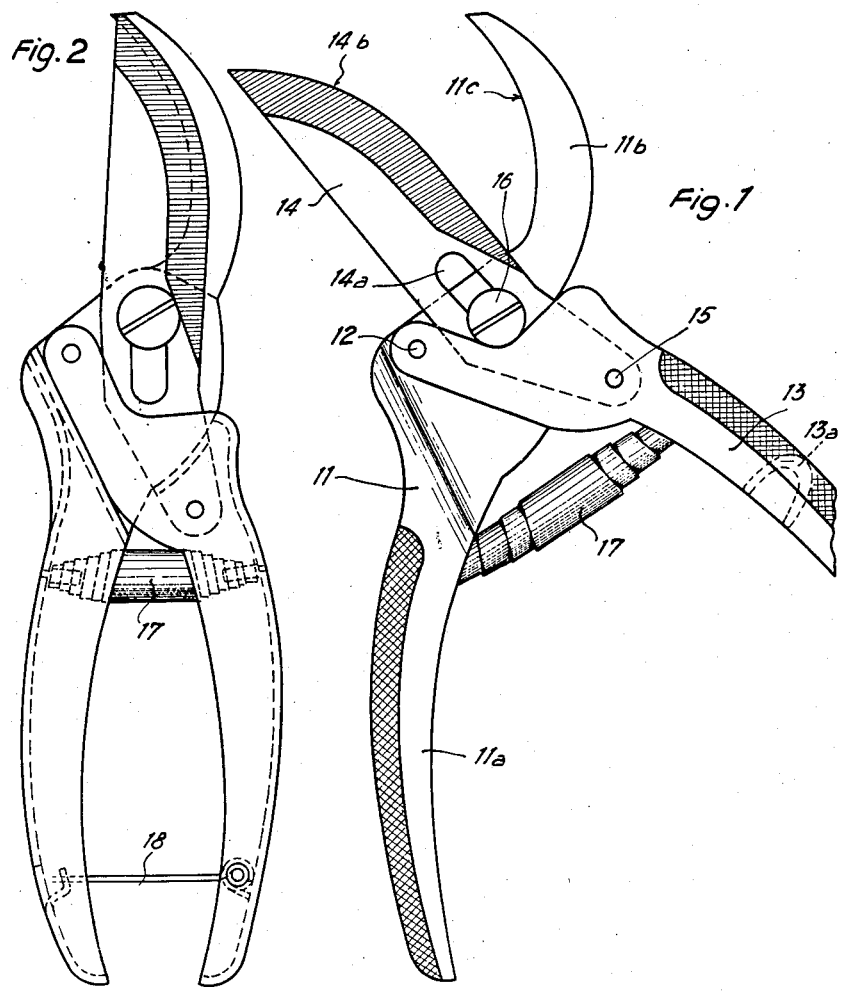
INVENTOR
AUGUST WEISENBURGER United States Patent Office 2,900,722
Patented Aug. 25, 1959

2,900,722
SHEARS

August Weisenburger, Frankfurt am Main, Germany

Application June 9, 1958, Serial No. 740,954

Claims priority, application Germany June 12, 1957

3 Claims. (Cl. 30—238)

Shears chiefly for gardening purposes are known in which a tractional cut is obtained through the fact that one of the arms of the shears forms a unitary member including the cutting section and the grip, the other arm being subdivided into a grip section and a cutting section pivotally connected with the latter and the rocking movement of which round the pivotal connection between the two sections is controlled by a pin and slot guiding system carried partly by said cutting section and partly by the first, unitary arm of the shears. In the shears of this type as executed hitherto with a hinged or pivotal-link arm, the slot is provided in the unitary arm while the pin engaging said slot is carried by the pivotal cutting section of the subdivided arm so as to ensure a substantially rectilinear cutting. Now, with a view to simplifying the execution of such shears and to improving their operation, there is provided, according to the invention, a bolt rigid with the unitary arm while the longitudinal slot is formed in the pivoting cutting section of the second arm, whereas the cutting edge extends as well known per se and in conformity with the cooperating edge along an arcuate line.

The accompanying drawings illustrate by way of example a preferred embodiment of the invention in a diagrammatic manner. In said drawings:

Fig. 1 is a side view of the shears in their open condition.

Fig. 2 shows the same shears in their closed condition.

The shears illustrated include a unitary arm 11 constituted by a grip 11a and a cutting section 11b, which latter is provided with an incurved cutting edge 11c. To this unitary arm 11 is pivotally secured at 12 the grip section 13 of the other arm of the shears, which is constituted by two pivotally connected sections. Said second arm includes thus, in addition to the grip section 13, a further, cutting section 14. The two sections are pivotally secured together at 15.

In order to control the movement of the rocking cutting section 14 so as to obtain a continuous cut, there is provided additionally on the unitary arm 11 a bolt or stud 16 adapted to engage a longitudinal slot 14a formed in the rocking cutting section 14 of the second arm. The cutting edge 14b of this cutting section 14 is incurved into an arcuate shape. The two arms of the shears are constituted, at least as concerns the grip sections 11a and 13, of stamped laminated sheet members, as shown by the cross-section at 13a. 17 designates the usual arm-spacing spring and 18 designates the conventional closing hook for the shears.

When using these shears preferably for nurseries, the three pivotal points 12, 15 and 16 are selected as shown, so as to obtain an excellent power transmission ratio. The cutting section 14 of the pivotal link forming the second arm of the shears is rocked upon actuation of the shears through engagement of the longitudinal slot 14a over the bolt 16, its pivotal point 15 turning round the pivot 12 forming the center of the shears. At the same time, the bolt 16 controls the rocking of the cutting section 14 in a manner such that, in addition to the movement of the latter towards the cooperating cutting section 11b, the edge 14b moves also longitudinally in parallelism with the longitudinal axis of the slot. It is thus possible to obtain with extremely simple means the well known tractional or rolling cut. By reason of the favorable transmission ratio, it is possible to cut through thick branches with a comparatively small expenditure of energy.

Not only the bolt 16, but also the bolt forming the pivot 15 may be provided in a readily removable manner, so that the cutting section 14 may be easily taken out. The cutting edge 11b is riveted to the grip 11a in any suitable manner which is not illustrated.

What I claim is:

1. Pruning shears comprising, in combination, a first integral shear means including a handle member, a blade member having a curved cutting edge, and a support portion intermediate said handle member and blade member; a second shear means including a second handle member, a second elongated support portion having one end integral with said second handle member, a second blade member having an outer curved cutting edge portion and an inner straight cutting edge portion, and a pivot connecting said one end of said second support portion with said blade member for turning movement about an axis, said second blade member having an elongate guide slot extending in direction of said second blade member; a guide pin secured to said first support portion and passing through said guide slot; and a main pivot means connecting said first support portion and the other end of said second support portion for turning movement about a main axis between a first position in which said blade members are closed and said first blade member extends in direction of said guide slot and of said second blade member, and a second position in which said blade members extend at an angle to each other, said main pivot means and said guide pin being spaced from each other in a direction transverse to the direction of said first blade member and being substantially equidistant from said pivot when said blade members are closed whereby said second blade member performs a longitudinal movement during movement of said blade members to said closed position.

2. Pruning shears comprising, in combination, a first integral shear means including a handle member, a blade member having a curved cutting edge, and a support portion intermediate said handle member and blade member; a second shear means including a second handle member, a second elongated support portion having one end integral with said second handle member, a second blade member having an outer curved cutting edge portion and an inner straight cutting edge portion, and a pivot connecting said one end of said second support portion with said blade member for turning movement about an axis, said second blade member having an elongate guide slot extending in direction of said second blade member, the center portion of said guide slot and the other end of said second support portion being equidistant from said axis of said pivot; a guide pin secured to said first support portion and passing through said guide slot; and a main pivot means connecting said first support portion and the other end of said second support portion for turning movement about a main axis between a first position in which said blade members are closed and said first blade member extends in direction of said guide slot and of said second blade member, and a second position in which said blade members extend at an angle to each other, said main pivot means and said guide pin being spaced from each other in a direction transverse to the direction of said first blade member and being substantially equidistant from said pivot when said blade members are closed whereby said second blade member performs a longitudinal movement during movement of said blade members to said closed position.

3. Pruning shears comprising, in combination, a first integral shear means including a handle member, a blade member having a curved cutting edge, and a support portion intermediate said handle member and blade member; a second shear means including a second handle member, a second elongated support portion having one end integral with said second handle member, a second blade member having an outer curved cutting edge portion and an inner straight cutting edge portion, and a pivot connecting said one end of said second support portion with said blade member for turning movement about an axis, said second blade member having an elongate straight guide slot extending in direction of said second blade member, the center portion of said guide slot and the other end of said second support portion being equidistant from said axis of said pivot; a guide pin secured to said first support portion and passing through said guide slot; and a main pivot means connecting said first support portion and the other end of said second support portion for turning movement about a main axis between a first position in which said blade members are closed and said first blade member extends in direction of said guide slot and of said second blade member, and a second position in which said blade members extend at an angle to each other, said main pivot means and said guide pin being spaced from each other in a direction transverse to the direction of said first blade member and being substantially equidistant from said pivot when said blade members are closed, said main pivot means being located on a line perpendicular to the center portion of said slot and being equally spaced from the ends of said slot in said closed position of said blade members whereby said second blade member performs a longitudinal movement during movement of said blade members to said closed position.

References Cited in the file of this patent
UNITED STATES PATENTS

| | | |
|---|---|---|
| 64,882 | Keck | May 21, 1867 |
| 134,922 | Moulton | Jan. 14, 1873 |
| 330,738 | Richard | Nov. 17, 1885 |
| 996,674 | Randle et al. | July 4, 1911 |
| 1,137,380 | Buell | Apr. 27, 1915 |